(12) United States Patent
Reinen (10) Patent No.: US 8,177,183 B2
(45) Date of Patent: May 15, 2012

(54) PORTABLE MULTIPURPOSE PLATFORM

(75) Inventor: Rish Reinen, Salem, OR (US)

(73) Assignee: Rish Reinen, Salem, OR (US)

( * ) Notice: Subject to any disclaimer, the term of this patent is extended or adjusted under 35 U.S.C. 154(b) by 553 days.

(21) Appl. No.: 12/172,400

(22) Filed: Jul. 14, 2008

(65) Prior Publication Data

US 2010/0006735 A1 Jan. 14, 2010

(51) Int. Cl.
*A47B 19/00* (2006.01)

(52) U.S. Cl. ............ 248/441.1; 248/126; 248/447; 248/454; 248/460

(58) Field of Classification Search .......... 248/126, 248/208, 441.1, 445, 447, 454, 460, 463; 108/7, 44, 46, 48, 147, 152; 224/275, 276, 224/402, 403, 482, 561, 564
See application file for complete search history.

(56) References Cited

U.S. PATENT DOCUMENTS

| | | | | |
|---|---|---|---|---|
| 1,534,095 A | * | 4/1925 | Walker | 108/9 |
| 3,376,009 A | | 4/1968 | Domino | |
| 3,948,476 A | | 4/1976 | Kuniyosi | |
| 4,176,743 A | * | 12/1979 | Fitzpatrick | 206/214 |
| 4,618,119 A | | 10/1986 | Powell | |
| 4,619,386 A | * | 10/1986 | Richardson | 224/277 |
| 5,180,133 A | * | 1/1993 | Chang | 248/452 |
| 5,503,361 A | | 4/1996 | Kan-O et al. | |
| 5,621,927 A | | 4/1997 | Reiss et al. | |
| 5,720,465 A | | 2/1998 | Peltzer et al. | |
| 5,791,487 A | | 8/1998 | Dixon | |
| 5,855,351 A | | 1/1999 | Cziraky et al. | |
| 6,027,093 A | | 2/2000 | Reiher | |
| 6,036,158 A | * | 3/2000 | Raasch | 248/441.1 |
| 6,092,663 A | | 7/2000 | Dixon | |

(Continued)

FOREIGN PATENT DOCUMENTS

EP 1692966 A2 11/2004

(Continued)

OTHER PUBLICATIONS http://www.levenger.com/Pagetemplates/Product/Product.asp?Params=Category=17-148|Level=2-3|pageid=5482|Link=Txt|tab=Description#Content Recipe for reading Our stainless steel bookstand adjusts to five angles. Because it's dishwasher-safe, it makes an ideal cookbook stand.

(Continued)

*Primary Examiner* — Gwendolyn Baxter (57) ABSTRACT

A multipurpose platform suitable for use as a desk and an easel is disclosed. The multipurpose platform includes a tablet with a flat front surface and items attached to the tablet, including at least one retractable hook, a retractable primary shaft, and a retractable shaft locking mechanism that can fix the position of the primary shaft relative to the platform. The retractable hook is deployable as a hook when the tablet is configured as a desk, and as a leg when the tablet is configured as an easel. The retractable primary shaft is deployable against a vertical surface, when the tablet is configured as a desk, and against a horizontal surface when the tablet is configured as an easel. Embodiments include a base and stand pole that can support the platform as a lectern or podium, a light, electronic accessories, and storage compartments. Some embodiments can be folded in half.

13 Claims, 11 Drawing Sheets

U.S. PATENT DOCUMENTS

| | | | |
|---|---|---|---|
| 6,119,994 A * | 9/2000 | Price | 248/276.1 |
| D459,397 S * | 6/2002 | Zeller et al. | D19/88 |
| 7,152,840 B2 | 12/2006 | Ottah et al. | |
| 7,301,765 B2 | 11/2007 | Huang | |
| 7,444,773 B2 * | 11/2008 | Kolodziejczak, Sr. | 40/591 |
| 7,611,112 B2 * | 11/2009 | Lin | 248/274.1 |
| 2006/0157630 A1 | 7/2006 | Buote | |
| 2007/0045503 A1 | 3/2007 | Samari | |

FOREIGN PATENT DOCUMENTS

| | | |
|---|---|---|
| JP | 20342349 A2 | 12/2000 |
| JP | 2002125768 A2 | 5/2002 |
| JP | 2006075448 A2 | 3/2006 |

OTHER PUBLICATIONS http://www.activeforever.com/ps-518-5-levo-desk-model-book-holder.aspx Levo Desk Model Book Holder Features: Straps: Your book straps firmly to the book board in less than a minute. Tilt: The book board tilts 360 degrees and can hold a book overhead while you read.

http://www.overstock.com/Electronics/3M-In-Line-Book-Document-Holder/2642593/product.html?cid=75683&fp=F 3M—In-Line Book/Document Holder Product Summary: 3M Copy Holder keeps documents in an easy to read, upright position. Designed to position directly between monitor.

* cited by examiner

PORTABLE MULTIPURPOSE PLATFORM

FIELD OF THE INVENTION

The invention generally relates to platforms, and more particularly to portable, multipurpose platforms.

BACKGROUND OF THE INVENTION

Often, while sitting at an event such as a conference, meeting, general business venue, church service, and such like, occupants find it difficult to conveniently position and support objects that they wish to use during the event, such as a book, materials for taking notes, writing implements, a laptop computer, documents, beverage containers, and such like.

Similar difficulties arise when someone is standing and has a need to support paperwork and/or other objects. For example, a lecturer may need a lectern to hold his notes, an artist may need an easel to support her canvas, a musician may require a music stand to hold his or her sheet music, and such like. If the venue does not include an appropriate support or stand, positioning and supporting these materials and pursuing these activities can be inconvenient, if not impossible.

Many approaches are known for supporting objects used during sitting or standing activities. However, many of these approaches are not easily portable. Others have a limited range of application, requiring a different device to be transported and used for each different type of circumstances.

Some multi-purpose and/or portable solutions have been proposed, such as a clip board for which the clip can be adjusted to convert the clip board into a portable desk, a drafting board that can also serve as an easel, and a foldable book holder. However, none of these known approaches is adaptable to a wide range of both sitting and standing activities.

SUMMARY OF THE INVENTION

A portable, multipurpose platform is claimed that is configurable as a desk and an easel, and is therefore suitable for both sitting and standing activities. In preferred embodiments, the platform can also be configured for use as a lectern, a music stand, a lap desk, and for many other applications. The multipurpose platform includes a tablet with a flat front surface, at least one retractable hook, a retractable primary shaft, and a retractable shaft locking mechanism. Each of the retractable hook, the retractable primary shaft, and the retractable shaft locking mechanism is attached to the tablet. The retractable hook is deployable as a hook when the tablet is configured as a desk, and as a leg, when the tablet is configured as an easel. The retractable primary shaft is deployable against a vertical surface when the tablet is configured as a desk, and against a horizontal surface when the tablet is configured as an easel. The retractable shaft locking mechanism can be deployed to fix the positioning of the retractable primary shaft relative to the platform.

In preferred embodiments, the retractable shaft locking mechanism is able to fix the positioning of the retractable primary shaft in multiple positions relative to the platform.

In other preferred embodiments, one end of the retractable primary shaft is pivotally attached to the back side of the tablet, thereby allowing the other end of the retractable primary shaft to pivot outward from the tablet. In some of these embodiments, the platform includes a releasable ratchet mechanism that is able to fix the pivot angle of the retractable primary shaft relative to the back side of the tablet. And in other of these embodiments the platform includes a primary shaft return spring, configured to apply a force tending to minimize the pivot angle of the retractable primary shaft relative to the back side of the tablet.

In various preferred embodiments, the retractable primary shaft is adjustable in length, and in some of these preferred embodiments the platform includes a releasable primary shaft length fixing mechanism and a primary shaft extension spring, wherein the primary shaft length fixing mechanism is able to fix the length of the retractable primary shaft, and the primary shaft extension spring is configured to apply a force that tends to return the retractable primary shaft to its minimum length.

In some preferred embodiments, the platform includes a clip for holding sheets of paper against the flat front surface. And in some of these embodiments the clip includes one or more electronic devices.

In certain preferred embodiments, the platform includes a pencil ledge attached to the tablet that is able to retain writing implements when the platform is configured as a desk and is positioned in at least a partially sloping orientation. In yet other preferred embodiments, the platform includes a drawer contained within the tablet.

In still other preferred embodiments, the platform includes a retractable chart-supporting rod that is deployable to provide extended support to a flexible sheet placed upon but extending partially beyond the flat front surface.

In some preferred embodiments, the platform includes a detachable stand pole and a detachable support base. The detachable stand pole is attachable to a central region of the tablet, and the detachable support base is attachable to the stand pole so as to allow the platform to be configured as a music stand, a podium, a lectern, and/or some other style of standing support. In some of these preferred embodiments, when not deployed, the stand pole and/or the support base are attachable to the tablet in a stored configuration.

In other of these preferred embodiments, the support base is able to support the platform and shaft extenders while the support base is resting on a horizontal surface, and in still other of these preferred embodiments the support base includes hooks that enable the support base to hang from a suitable vertical object and thereby to support the stand pole and the platform.

In certain preferred embodiments, the platform includes a second retractable primary shaft and a cross member that connects distal ends of the two primary shafts, so as to provide two points of supporting contact when the retractable primary shafts are deployed against a surface.

In other preferred embodiments, the tablet is split into two halves and hinged so as to allow the two halves to fold against each other. In still other preferred embodiments, the platform includes a detachable container that can be attached to the tablet so as to contain objects while the tablet is in use.

In some preferred embodiments, the platform includes a source of electrical power. And in some of these preferred embodiments, the source of electrical power is a battery or a power supply connectable to a wall outlet.

In preferred embodiments, the platform includes a light that is able to illuminate the flat front surface. In some of these embodiments the light is retractable into the platform, and in other of these embodiments the light is attached to a light supporting shaft that is able to position the light above the flat front surface. In some of these embodiments, the light supporting shaft is adjustable in at least one of length and orientation.

In preferred embodiments, the multi-purpose platform includes a fan. The fan can be configured to perform various functions, including providing a flow of air suitable for cooling an object placed on the tablet, a flow of air suitable for cooling a user of the tablet, and a reverse flow of air that creates a vacuum suitable for holding a flexible sheet against the flat front surface.

In other preferred embodiments, the platform includes an extendable foot that is able to support the tablet at an extended height above an object on which the foot is resting.

DETAILED DESCRIPTION OF PREFERRED EMBODIMENTS

Figure 1:
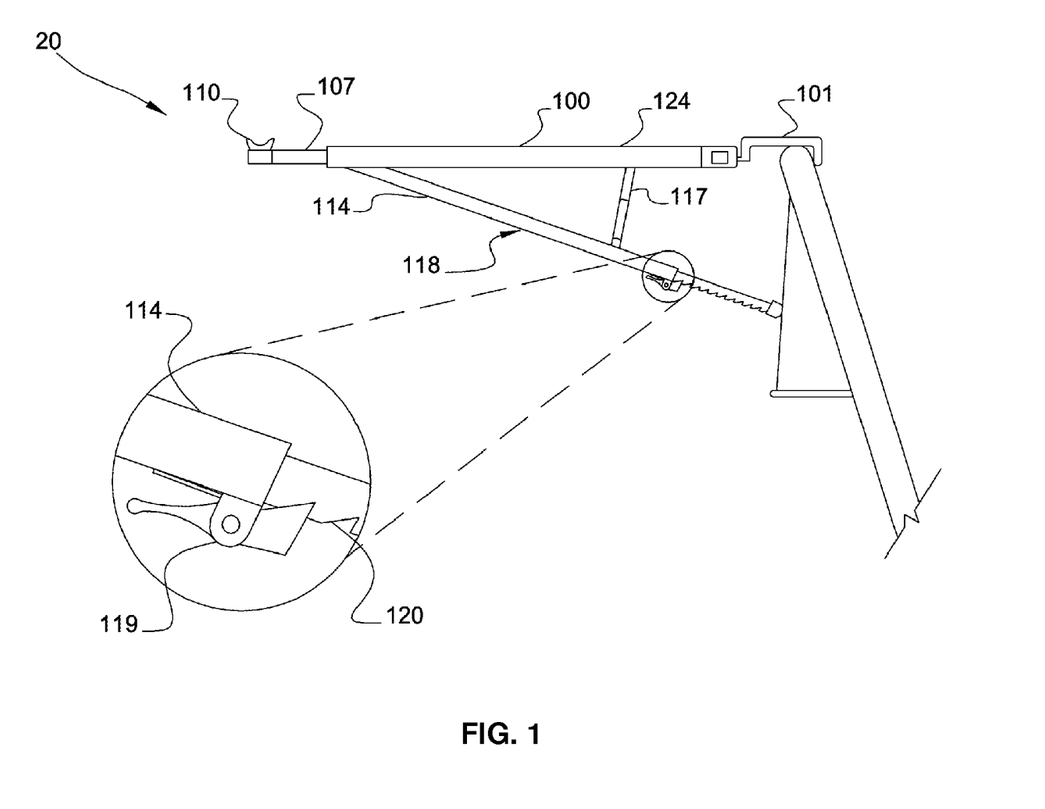
FIG. 1 is a side view of a portable multipurpose platform configured as a desk according to a simple embodiment of the present invention.

With reference to FIG. 1, the present invention is a multipurpose platform 20 suitable for use as both a desk and an easel. FIG. 1 shows a side view of a basic preferred embodiment in a desk configuration. The platform 20 includes a tablet 100 having a flat front surface 124. In the embodiment of FIG. 1, the platform 20 further includes two retractable hooks 101 attached to the tablet 100, a retractable primary shaft 118 attached to the tablet 100 and a retractable shaft locking mechanism 117 attached to the tablet 100. The retractable hooks 101 are deployable as hooks when the platform 20 is configured as a desk, as shown in the figure, and as legs when the platform 20 is configured as an easel as is discussed in more detail below in reference to FIG. 3. In preferred embodiments, the retractable hooks 101 are configured to rotate about an axis along the surface 124 and parallel to the edges of the tablet 100, such that the retractable hooks 101 may be engaged with chairs and other objects in various configurations. In some embodiments, the retractable hooks 101 are rotatable about an axis perpendicular to the surface 124, so as to be easily foldable in a compact form alongside the tablet 100.

In the configuration of FIG. 1, the hooks 101 are resting on top of the back of a chair, so as to support the distal end of the platform 20, which is nearest to the chair. The retractable primary shaft 118 is deployed such that the distal end of the retractable primary shaft rests against the back of the chair, thereby supporting the proximal end of the platform 20.

The retractable shaft locking mechanism 117 fixes the position of the retractable primary shaft 118 with respect to the tablet 100. In the embodiment of FIG. 1, the retractable shaft locking mechanism 117, is a linked member that fixes the retractable primary shaft 118 at a predetermined angle with the platform 20. In other embodiments, some of which are described below, the shaft locking mechanism 117 uses a ratchet-like adjustment or other adjustable mechanism to allow adjustment of the position of the retractable primary shaft 118 relative to the platform 20.

In the embodiment of FIG. 1, the retractable primary shaft 118 is configured to be adjustable in length. It includes a telescopic extensible arm 120 that is configured to be extended from a receiving member 114 of the retractable primary shaft 118. The telescopic extensible arm 120 is locked at a desired length using a releasable ratchet mechanism 119. In other embodiments similar approaches well known in the art are used for temporarily fixing the length of the extensible arm 120.

Figure 2:
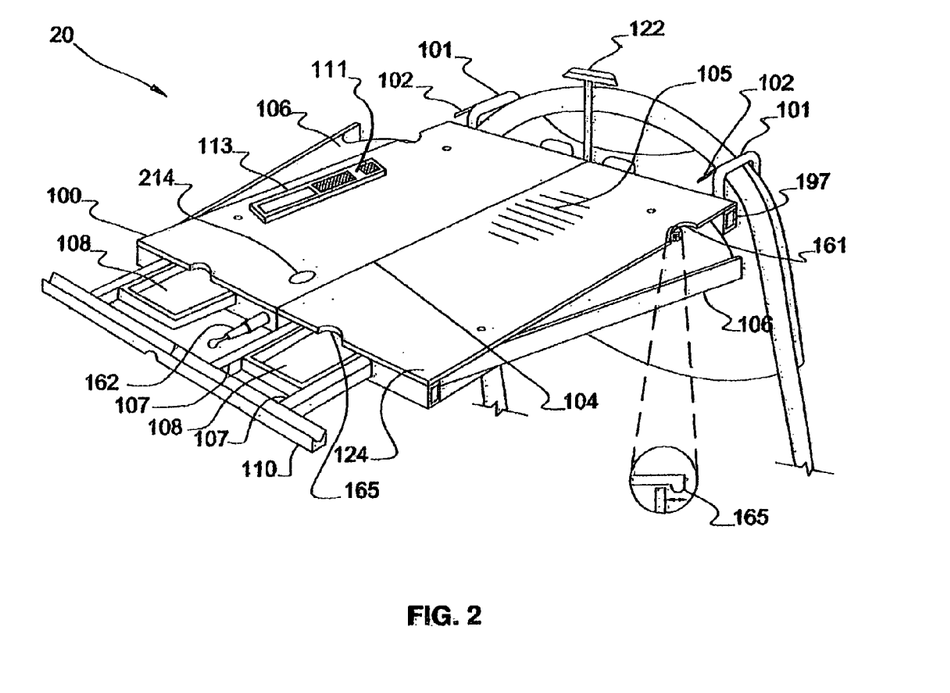
FIG. 2 is a perspective view of a portable multipurpose platform configured as a desk according to an embodiment of the present invention that includes a plurality of enhancing features.

FIG. 2 is a perspective view of a portable multipurpose platform configured as a desk in an embodiment that includes a plurality of enhancing features. The tablet 100 includes a volume below the flat surface of the tablet 100 that is configured to store the retractable primary shaft 118, the retractable hooks 101, and other elements of the platform 20.

In the embodiment of FIG. 2, the retractable hooks 101 include document support nubs 102 that are configured to releasably hold the tops of documents against the platform 20. The platform 20 further includes side drawers 106 configured to be stored within the sides of the tablet 100 and to pivotally extend out of the table 100 as required, so as to provide additional volume for storage. Small cut-outs 161 in the flat surface of the tablet 100 allow for the side drawers 106 to be easily grasped and pulled out of the sides of the tablet 100, and small bumps 165 in the underside of the flat surface of the tablet 100 retain the side drawers 106 in place when they are stored inside of the tablet 100.

The platform 20 illustrated in FIG. 2 further includes a bottom drawer 110 containing a plurality of compartments 108, defined by dividers 107, inside of the drawer 110. The bottom edge of the bottom drawer 110 includes a trough suitable for holding pencils and other small objects. The platform 20 further includes an electronic clip 111 with a display 113. The electronic clip includes a solar-powered calculator and other convenient features. In various embodiments, additional electronic features include: a Personal Digital Assistant (PDA); a USB data storage memory; a database of appointments, reminders, phone numbers, and addresses; a clock; a timer; a stop watch; a media player; a phone; and various other electronic devices.

The platform 20 in the embodiment of FIG. 2 further includes a lighting device 122 configured to illuminate the flat surface of the tablet 100. The lighting device 122 includes a light shaft, and is configured to be retractable into the platform 20. The light shaft is adjustable in length and orientation, and in preferred embodiments is powered by a battery disposed within the tablet 100 and/or a power supply connectable to a wall outlet.

The platform 20 in FIG. 2 includes a partition 104 in the center of the flat surface of the tablet 100. In some embodiments, this partition 104 allows the flat surface to be opened so as to provide easy access to the interior of the tablet 100. In other preferred embodiments, the tablet 100 is hinged along the partition 104, so as to allow the two halves of the platform to fold against each other, as is discussed below in more detail in FIG. 9.

Note that in the embodiments of FIG. 1 and FIG. 2, the shape of the tablet 100 is generally rectangular, while in other embodiments the tablet 100 is round, rectangle, square, triangular or has some other shape that provides a substantively flat surface.

Figure 3:
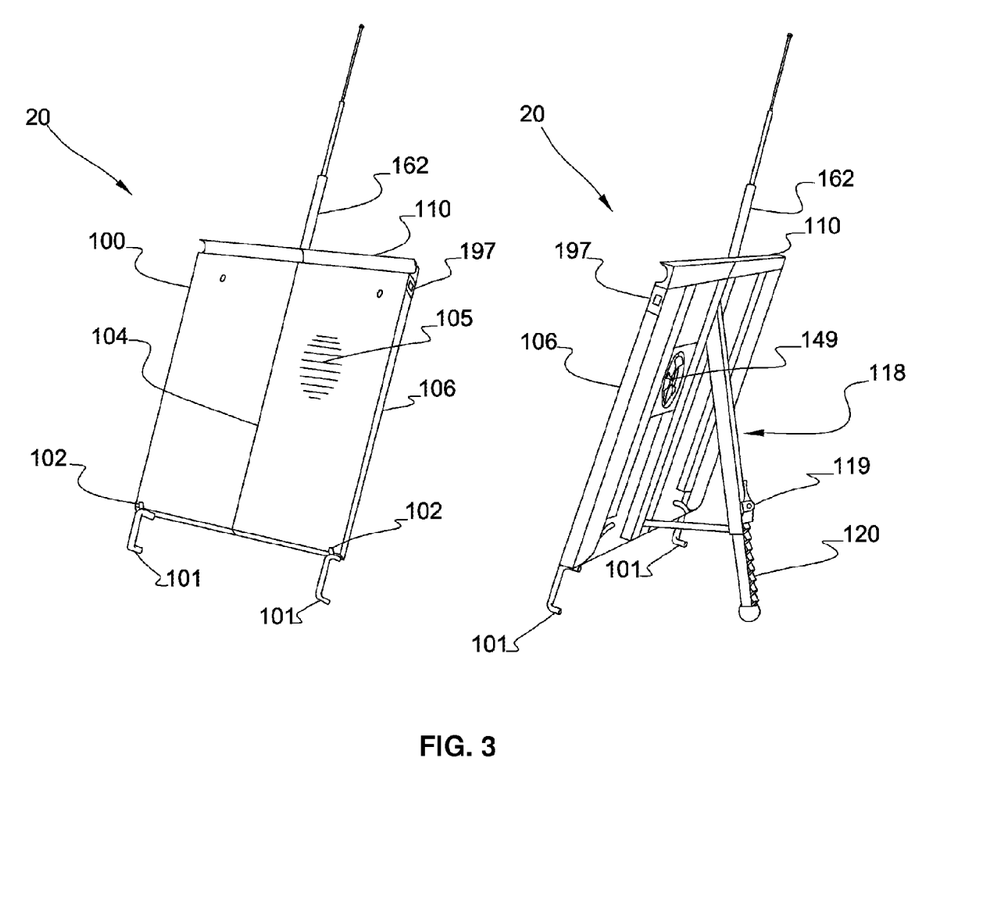
FIG. 3 is a perspective view of a portable multipurpose platform configured as an easel according to an embodiment of the present invention.

FIG. 3 is a perspective view of the embodiment of FIG. 1 configured as an easel. The platform 20 includes an extensible member 162 configured to provide extended support to a flexible sheet placed upon but extending partially beyond the flat front surface of the tablet 100.

The platform 20 in FIG. 3 further includes a fan 149, and a cooperative opening 105 in the flat surface of the tablet 100 to provide a flow of air suitable for cooling an object placed on the tablet 100 and/or for providing ventilation and cooling to a user of the platform 20. In some embodiments, the fan 149 can also be configured to operate in a reverse direction so as to create a vacuum like condition suitable for holding a flexible sheet against the front surface of the tablet 100. In some embodiments the fan can be controlled by a switch or similar means to cause a flow of air in either direction.

As shown in FIG. 3, when the platform 20 is configured as an easel, the hooks 101 are deployed as feet, and the retractable primary shaft 118 is pivoted outward from the tablet 100 so as to rest on the ground as the third leg of a tripod. The retractable shaft locking mechanism 117 fixes the angle of the retractable primary shaft 118 relative to the tablet 100, thereby providing standing stability to the platform in its easel configuration.

Figure 4:
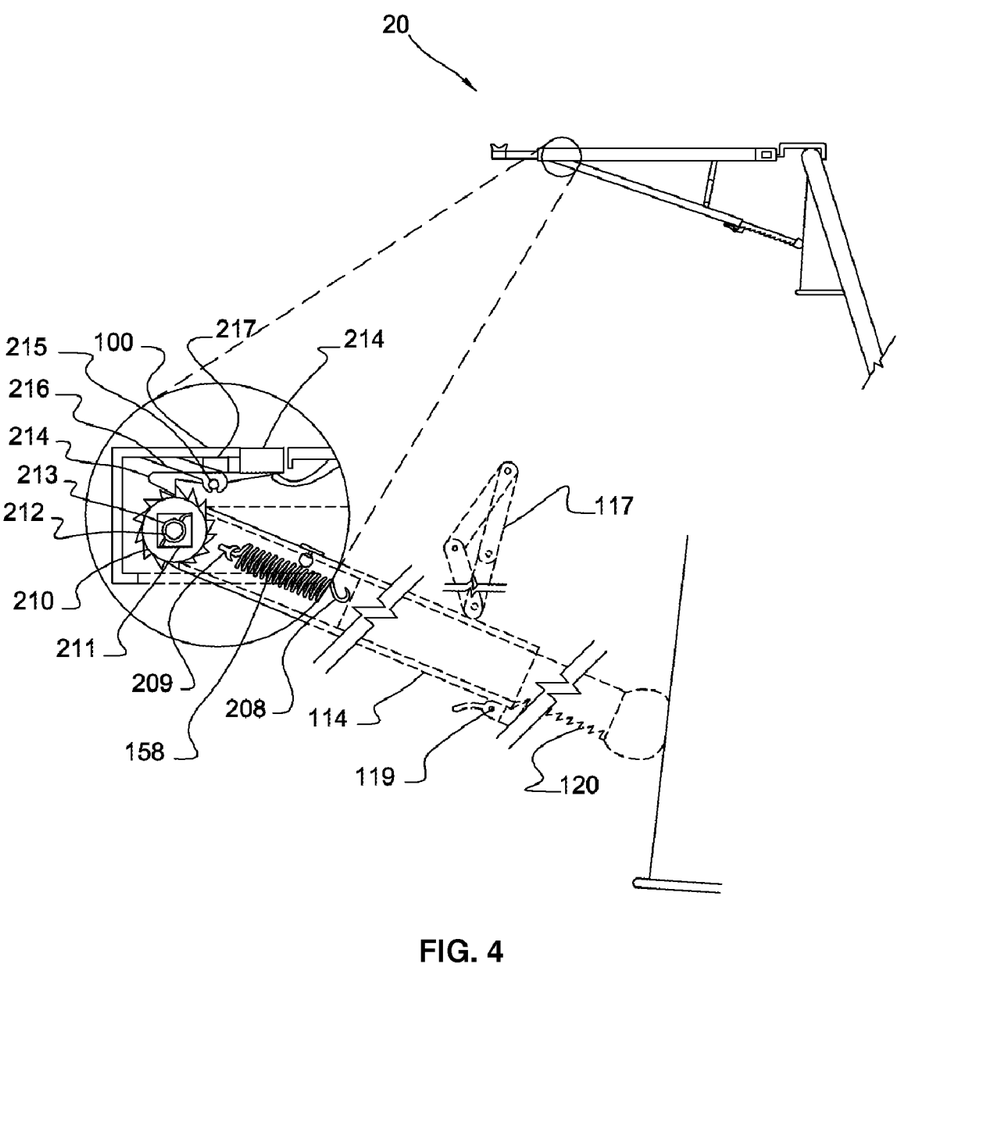
FIG. 4 is a detailed side view of a retractable primary shaft of a portable multipurpose platform according to an embodiment of the present invention.

FIG. 4 is an expanded side view showing design details of the retractable primary shaft 118 of the preferred embodiment of FIG. 1. The retractable primary shaft 118 includes a primary shaft extension spring 158. The distal end 208 of the primary shaft extension spring 158 is attached to the telescopic extensible arm 120 and the proximal end 209 of the primary shaft extension spring 158 is fixed to the receiving member 114. The primary shaft extension spring 158 is therefore configured to apply a force that tends to return the retractable primary shaft 118 to its minimum length by retracting the telescopic extensible arm 120 into the receiving member 114 when the ratchet mechanism 119 that fixes the position of the telescopic extensible arm 120 is released.

The multipurpose platform 20 of FIG. 4 also includes a releasable ratchet mechanism that fixes the pivot angle of the retractable primary shaft 118 relative to the back side of the tablet 100. The releasable ratchet mechanism includes a ratchet wheel 210, a second pawl 214, a primary shaft pivot spring 213 and a pawl spring 216. The second pawl 214 is adapted to mount on a pin 215 and rotate about an axis through the pin 215. The pin 215 is rigidly attached to the tablet 100 through a connecting member 217. The distal end of second pawl 214 is disposed within the tablet 100 so as to act as an actuating button. The ratchet wheel 210 includes a second cavity 211 having a fixed axis 212. The primary shaft pivot spring 213 is adapted to mount on a fixed axis 212, and is configured to apply a force tending to minimize the pivot angle of the retractable primary shaft 118 relative to the back side of the tablet 100. As illustrated in FIG. 4, the proximal end of the second pawl 214 is configured to engage with the teeth of the ratchet wheel 210, so as to allow circular movement of the ratchet wheel 210 in the clockwise direction and restrict movement in the anticlockwise direction.

Figure 5:
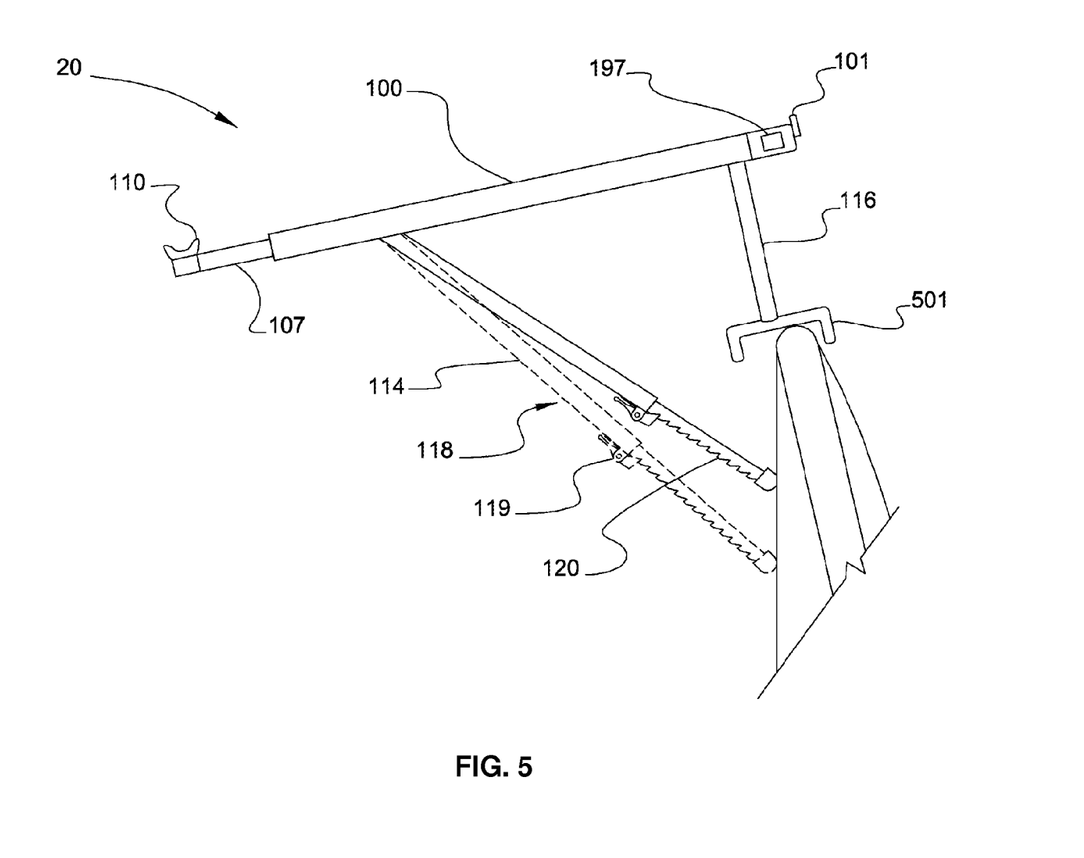
FIG. 5 is a side view of a portable multipurpose platform configured as a desk according to an embodiment of the present invention that includes an extendable foot.

FIG. 5 illustrates a preferred embodiment of the portable multipurpose platform 20 configured as a desk that includes an extendable foot 501 connected to the platform 20 by an extendable foot shaft 116. The extendable foot 501 allows the platform 20 to be supported at an extended height above an object on which the foot 501 is resting, for example on the back of a seat in a sports stadium, auditorium, theater and such like.

Figure 6:
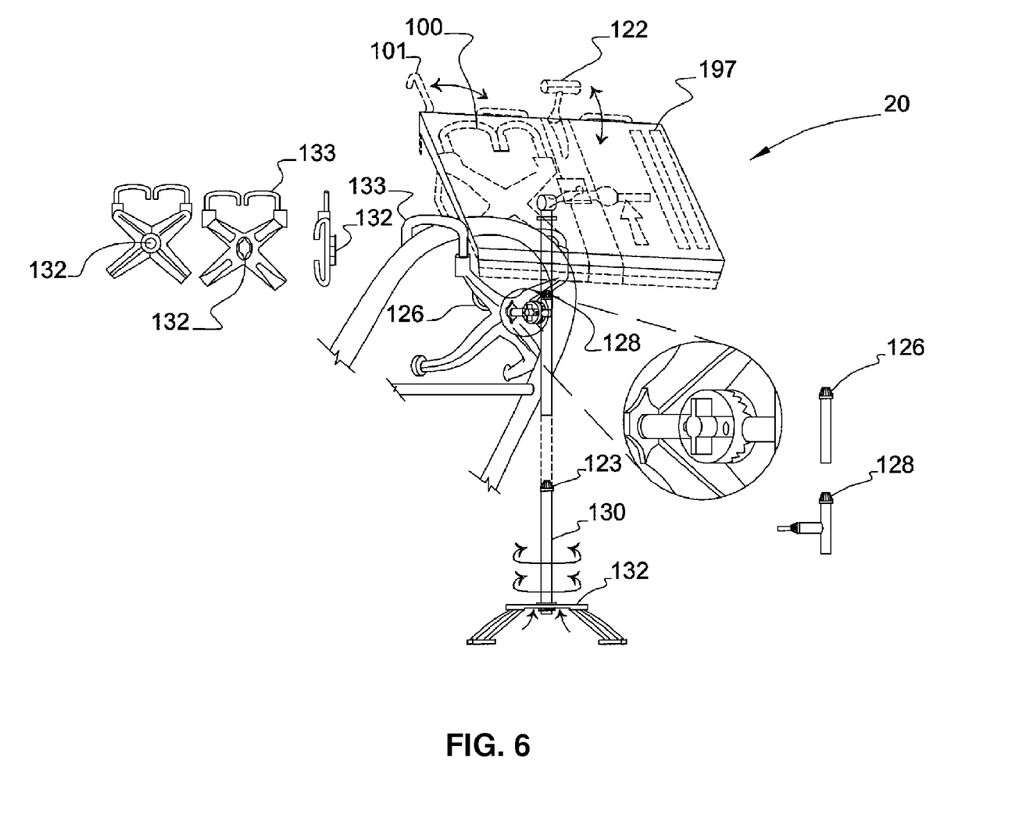
FIG. 6 is a perspective view of a portable multipurpose platform configured as a music stand according to an embodiment of the present invention.

FIG. 6 is a perspective view of a portable multipurpose platform 20 in an embodiment that is configurable as a music stand. In this embodiment, the multipurpose platform 20 includes a detachable stand pole 126 and a detachable support base 132. The detachable stand pole 126 is attached to a central region of the tablet 100. A plurality of stand pole extenders 123 are attachable to the detachable stand pole 126 for extending the length of the stand pole 126. The detachable support base 132 is configured to attach to the stand pole extenders 123 or to the detachable stand pole 126. In the embodiment of FIG. 6, the detachable support base 132 is generally an 'X' shaped element having a center and arms. As illustrated in the figure, the center is elevated, while the arms act as supporting legs. The center of the detachable support base 132 is configured to receive the stand pole 126 or the stand pole extenders 123.

The detachable support base 132 further includes foldable hooks 133 that can be used to hang the support base from a convenient vertical support element such as the back of a chair. The detachable support base is therefore able to support the platform 20 either by standing on the ground or by hanging from a vertical support element. When the detachable support base 132 is hanging from a vertical support element, the detachable stand pole 126 is coupled through a connecting element 128 to a rod 130 that emerges from the center of the detachable support base 132.

When configured as discussed above, the platform 20 can serve as a music stand, a podium, a lectern, and other standing supports. When the platform 20 is not configured as shown in FIG. 6, the detachable support base 132, the stand pole extenders 123, and the stand pole 126 are attachable to the tablet 100 in a stored configuration. For example, the detachable support base 132 and the shaft extenders 123 may be stored in the bottom drawer 110 or in the side drawers 106. FIG. 6 further depicts different views for the stand pole 126 and of the detachable support base 132.

Figure 7:
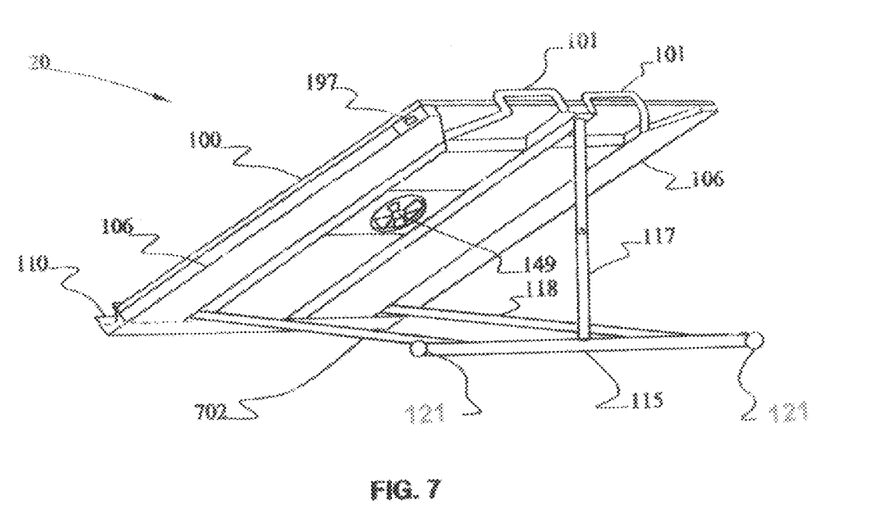
FIG. 7 is a side view of a portable multipurpose platform configured as a lap desk and/or a book stand according to an embodiment of the present invention that includes two retractable primary shafts.

FIG. 7 is a perspective view of a portable multipurpose platform 20 configured as a lap desk in an embodiment that includes two retractable primary shafts. The second retractable primary shaft 702 is connected to the first retractable primary shaft 118 by a cross member 115 that connects the distal ends of the two primary shafts 118 and 702 so as to provide two points of supporting contact when the retractable primary shafts 118, 702 are deployed against a vertical or a horizontal surface. In the embodiment shown in FIG. 7, the retractable shaft locking mechanism 117 is connected to the cross member 115. In the embodiment of FIG. 7, the platform 20 can be supported by a horizontal surface, such as the ground or the lap of a user, as well as by a vertical surface, as described with reference to FIG. 1 above. In the embodiment of FIG. 7, the cross member 115 has rubber or plastic feet 121 attached to either end of the cross member 115, so as to provide firm and definite points of contact and frictional support when deployed against either a vertical or a horizontal surface, especially if the surface is not entirely flat.

Figure 8A:
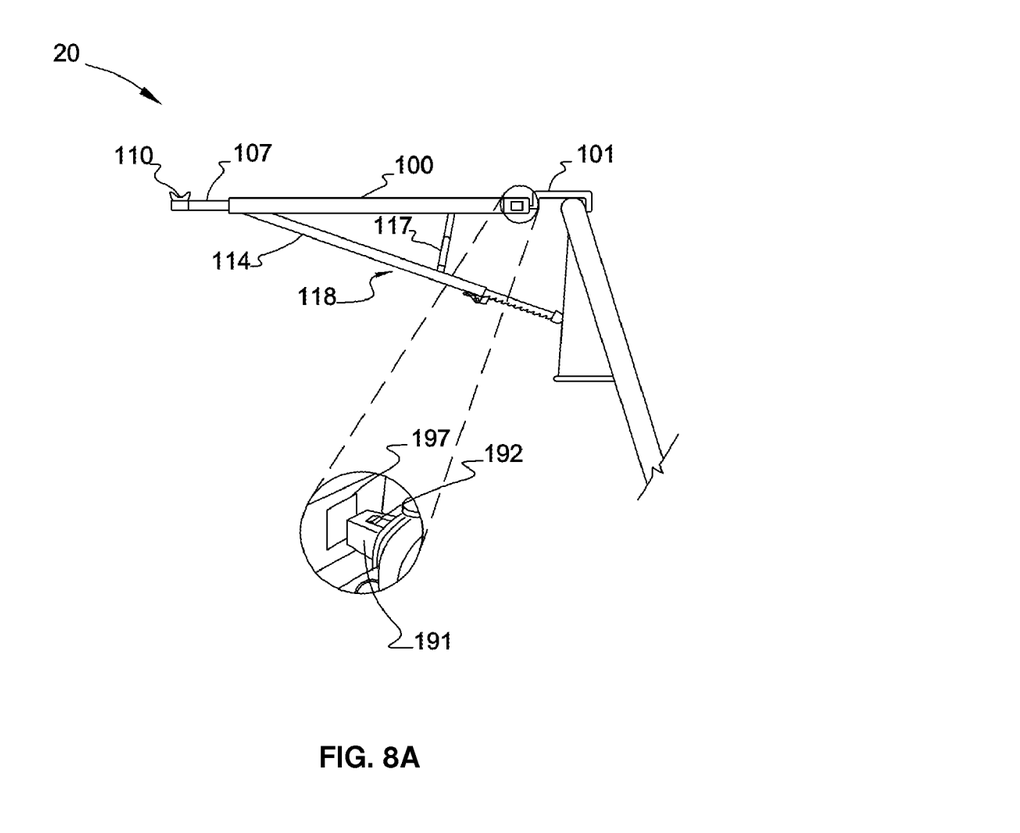
FIG. 8A is a side view of a portable multipurpose platform having an attachment socket for attachment of accessory items according to an embodiment of the present invention.
Figure 8B:
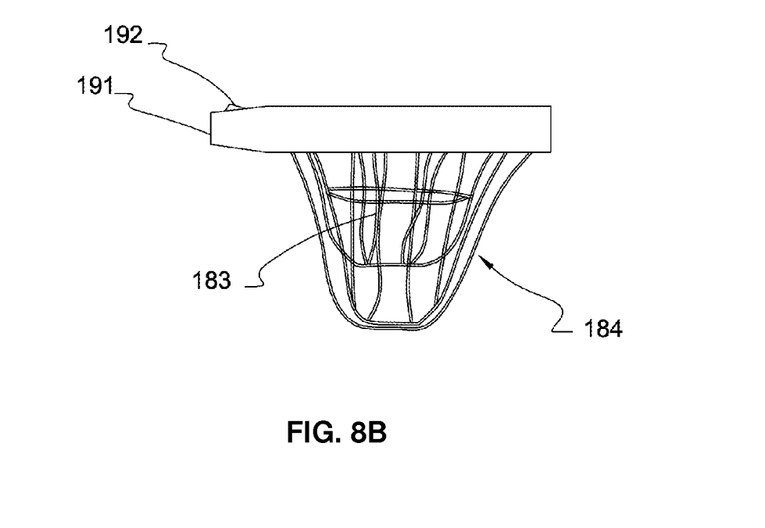
FIG. 8B is a side view of a container configured to be attachable as an accessory item to the portable multipurpose platform of FIG. 8A according to an embodiment of the present invention.

FIG. 8A presents a side view of a multi-purpose platform 20 that includes an accessory socket 197 configured so as to accept removable attachment of an accessory item with a compatible plug 191 and latch mechanism 192. FIG. 8B presents a view of a container 184 configured to be attachable to the portable multipurpose platform 20 according to an embodiment of the present invention. In the embodiment of FIG. 8B, the container 184 includes a jack 191 that is attachable to the accessory socket 197 (FIG. 8A) on the portable platform 20. In the embodiment illustrated in FIGS. 8A and 8B, the jack 191 includes a click-lock mechanism 192 that fixes the jack to the accessory socket 197. The jack 191 and the container 184 are removable by actuating a clip 192 on the jack 191. The container 184 is configured as a basket that can hold light objects, such as paper clips, note pads, tacks, erasers, cell phones, IPOD's, palm pilots, soda cans, and the like, while the platform 20 is in use. In various embodiments, a plurality of interchangeable accessories of multiple shapes and sizes is included.

Figure 9:
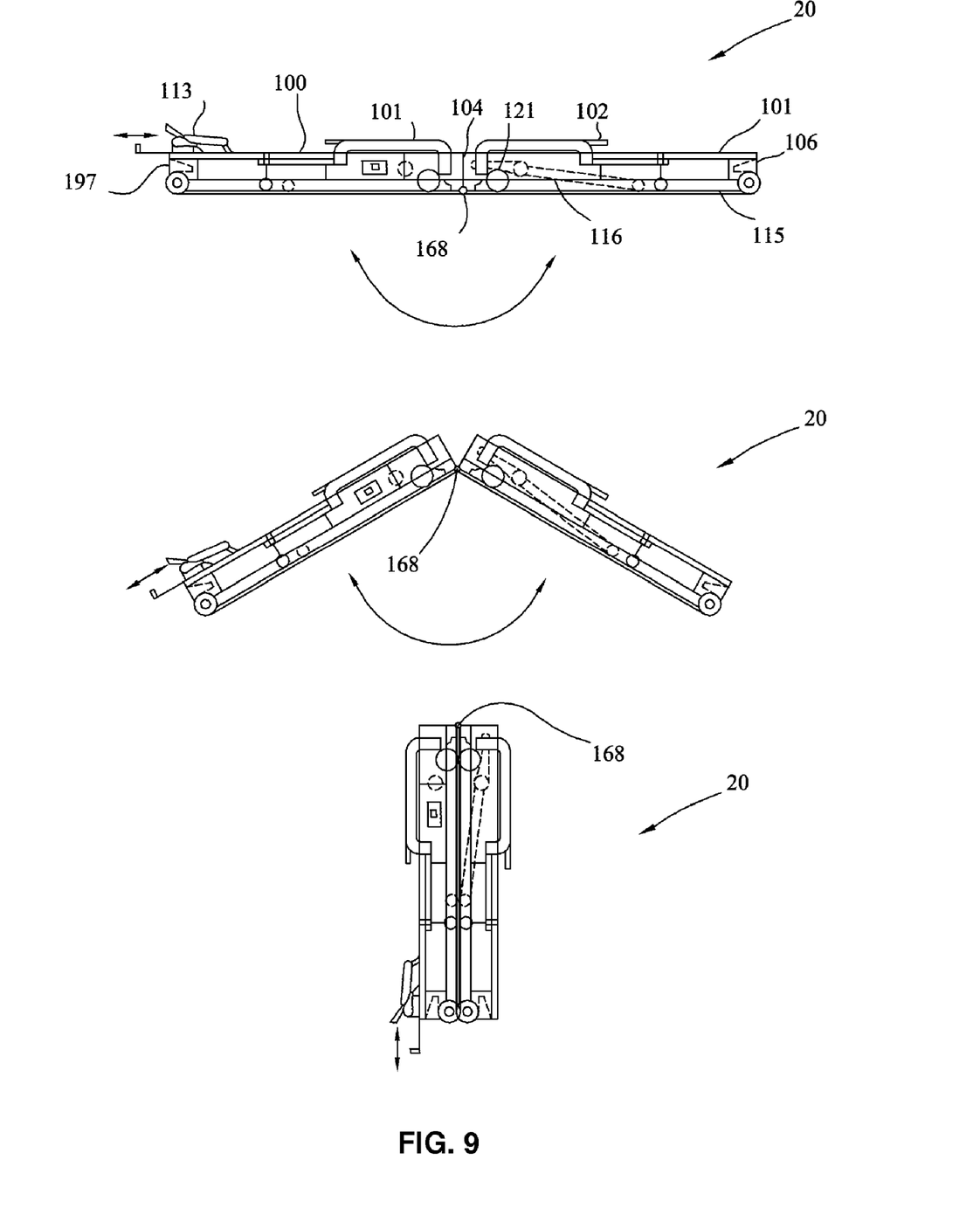
FIG. 9 is a side view of a portable multipurpose platform in a folded configuration according to an embodiment of the present invention.

FIG. 9 is a side view of a portable multipurpose platform 20 in a folded configuration according to an embodiment of the present invention. The portable multipurpose platform 20 is configured to fold along a partition 104 as shown in the figure. In the illustrated embodiment, the tablet 100 is split into two halves, and a hinge 168 is positioned along the partition at the back side of the tablet 100 to allow the two halves of the tablet 100 to fold against each other. The folded configuration of the platform 20 in this embodiment is convenient to carry and occupies comparatively less space than unfolded configurations. In some embodiments, the size of the platform 20 can be configured so as to fit in a small briefcase or even in a large coat pocket.

Figure 10:
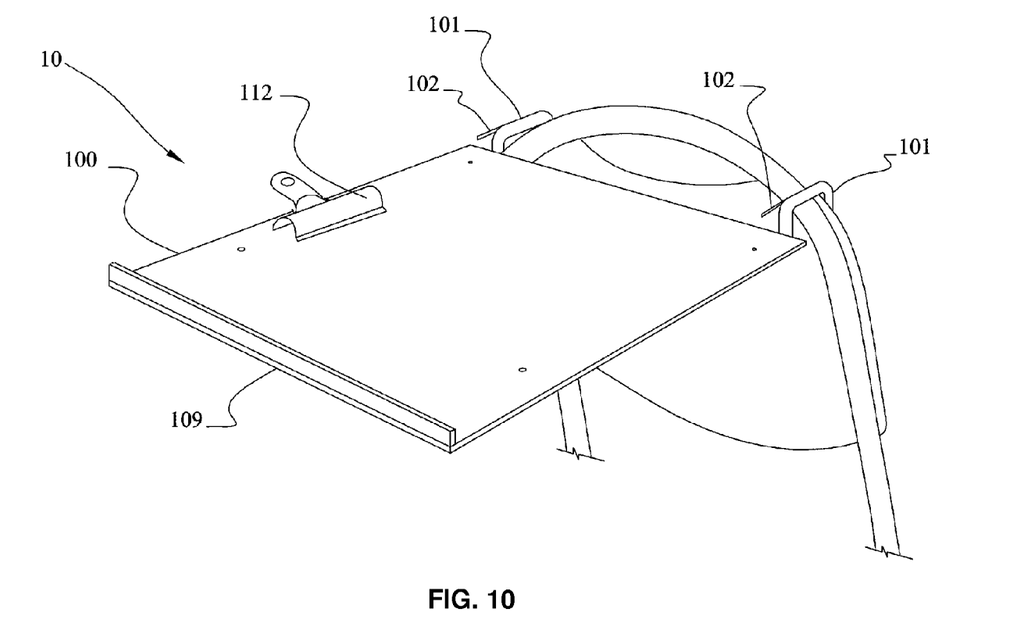
FIG. 10 is a perspective view of a portable multipurpose platform configured as a lap desk according to an embodiment of the present invention that includes a mechanical paper-holding clip.

FIG. 10 illustrates a portable multipurpose platform 10 in a simple embodiment that includes a ledge 109 attached to the proximal end of the tablet 100. The ledge 109 is configured to inhibit objects such as pencils, pens, books, and other items placed on the tablet 100 from sliding off of the tablet 100 when the tablet 100 is in an inclined position. The tablet 100 includes a mechanical clip 112 attached to the tablet 100 by a screw 111 or other fastening mechanism and able to conveniently hold papers and other items firmly against the flat surface of the tablet 100.

Figure 11:
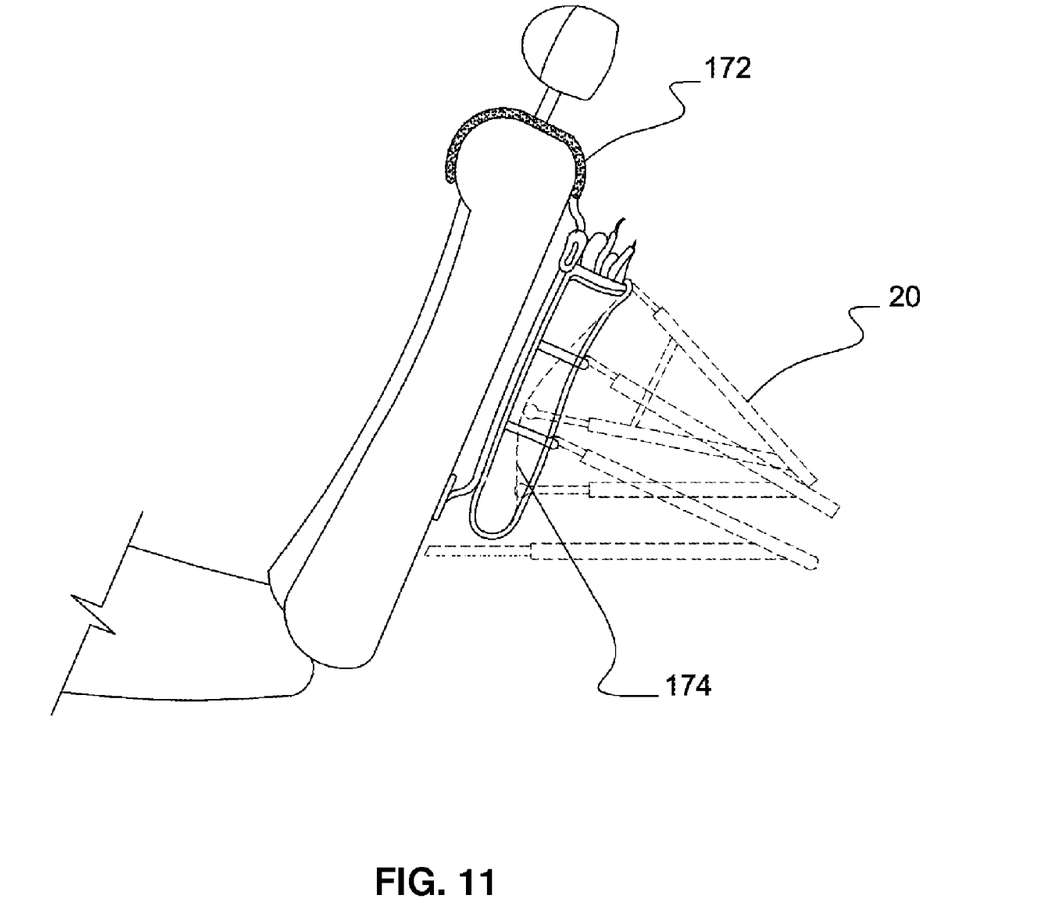
FIG. 11 is a side view of a portable multipurpose platform in an embodiment that includes an adaptor for attaching the platform to the back of an automobile seat.

FIG. 11 is a side view of an embodiment of a portable multipurpose platform 20 that includes an adaptor 174 configured to mount the platform 20 to the back of an automobile seat. The adaptor 174 includes hooks 172 appropriately sized and configured to hang from the back of an automobile seat, as well as attachment points where the retractable hooks 101 of the platform 20 can be attached. The adaptor also includes a containment space where items of convenience can be stored while the adaptor and the platform are in use.

Various embodiments discussed herein provide a portable and multipurpose platform that can be configured and used in a number of ways. For example, the platform can be used as a clipboard, an adjustable angled desk, a level table surface, a lap board, a book support, a stand, a prop, an easel, a music stand, a portable podium/pulpit, a hanging display aid, a laptop support, a laptop cooling fan/ventilator, a storage container/organizer, and various other types of stand. The portable multipurpose platform can further be used as a container for storing pens, paper clips, note pads, tacks, erasers, cell phones, IPOD, palm pilots, etc. The invention therefore provides several advantages over the prior art by combining a large number of functionalities into to a single and portable device.

Other modifications and implementations will occur to those skilled in the art without departing from the spirit and the scope of the invention as claimed. Accordingly, the above description is not intended to limit the invention except as indicated in the following claims.

What is claimed is:

1. A multi-purpose, portable, platform suitable for use as a desk, lap desk, table, table top, book holder, or easel, the platform comprising:
    a) a tablet with a flat front surface which is reducible in size for portability and to accommodate different sized items;
    b) at least one retractable hook attached to the tablet, each hook being deployed as a hook when the tablet is configured as a desk, and each said hook being deployable as a leg when the tablet is configured as an easel;
    c) a first retractable primary shaft attached to the tablet, the retractable primary shaft being deployable against a vertical surface when the tablet is configured as the desk, and the retractable primary shaft being deployable against a horizontal surface when the tablet is configured as the easel;
    d) a retractable shaft locking mechanism attached to the tablet, the retractable shaft locking mechanism being deployable so as to fix the positioning of the retractable primary shaft to the platform;
    e) a detachable stand pole attachable to a central region of the tablet, and
    f) a detachable support base attachable to the stand pole so as to allow the platform to be configured as at least one of a music stand, a podium, a lectern, and other standing supports, when not deployed, the stand pole and the support base being attachable to the tablet in a stored configuration.

2. The platform of claim 1, wherein the retractable shaft locking mechanism is able to fix the positioning of the retractable primary shaft in a plurality of ranges from various open positions to a flat, closed position relative to the platform.

3. The platform of claim 1, wherein a proximal end of the retractable primary shaft opposite the end of connection to the tablet is able to be shortened and; lengthened so as to accommodate the adjustment of a pivot angle of the upper surface of the tablet.

4. The platform of claim 3, further comprising a releasable ratchet mechanism that is able to fix the pivot angle of the retractable primary shaft relative to the back of the tablet.

5. The platform of claim 3, further comprising a primary shaft pivot spring configured so as to apply a force tending to minimize the pivot angle of the retractable primary shaft relative to the back side of the tablet.

6. The platform of claim 1, wherein the retractable primary shaft is adjustable in length.

7. The platform of claim 6, further comprising:
    a releasable primary shaft length fixing mechanism that is able to fix the length of the retractable primary shaft; and
    a primary shaft extension spring configured so as to apply a force that tends to return the retractable primary shaft to a minimum length.

8. The platform of claim 1, further comprising a pivoting drawer that opens at a single point of rotation in an arcuate configuration, contained within the tablet.

9. The platform of claim 1, further comprising a retractable chart supporting rod deployed at the top surface of the tablet so as to provide extended support to a flexible sheet placed upon but extending partially beyond the flat front surface.

10. The platform of claim 1, wherein
the support base is able to support the platform and shaft extenders while the support base is resting on a horizontal surface.

11. The platform of claim 1, wherein
the support base includes hooks that enable the support base to hang from a suitable object and thereby to support the stand pole and platform.

12. The platform of claim 1, further comprising a second retractable primary shaft and a cross member that connects distal ends of the two primary shafts so as to provide two points of supporting contact when the retractable primary shafts are deployed against a surface.

13. The platform of claim 1, further comprising a detachable, compartmented platform that can be attached to the tablet so as to hold objects while the tablet is in use.

* * * * *